Patented July 2, 1929.

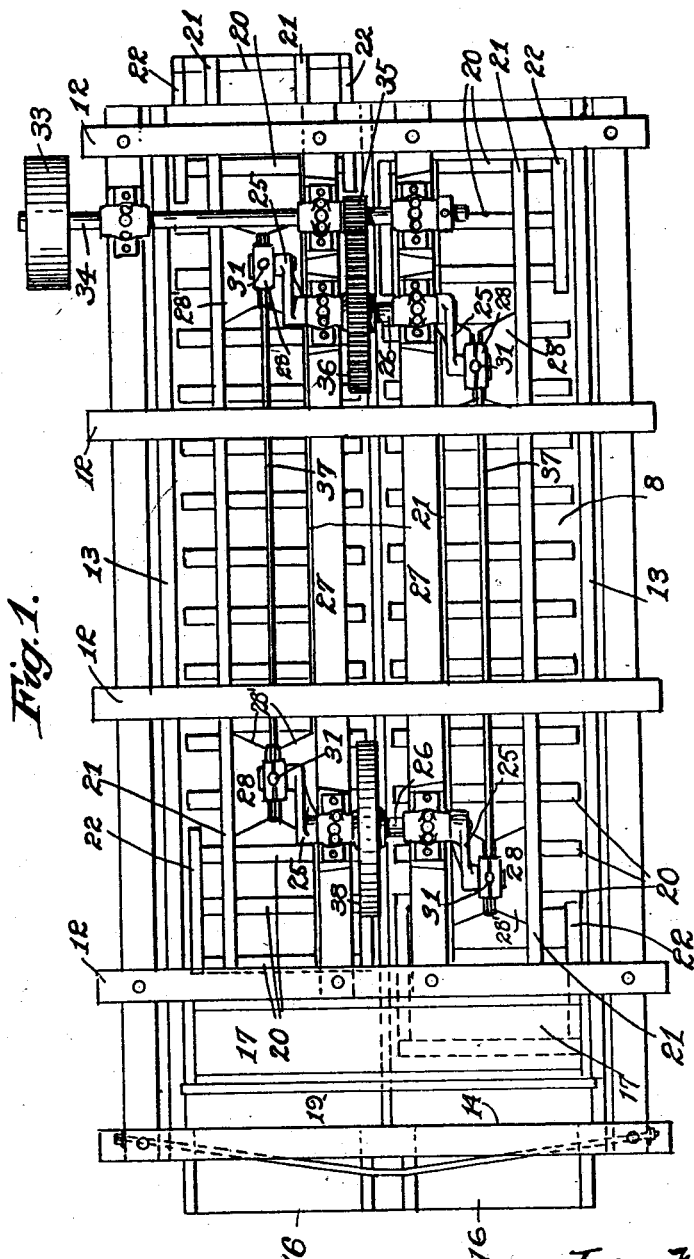

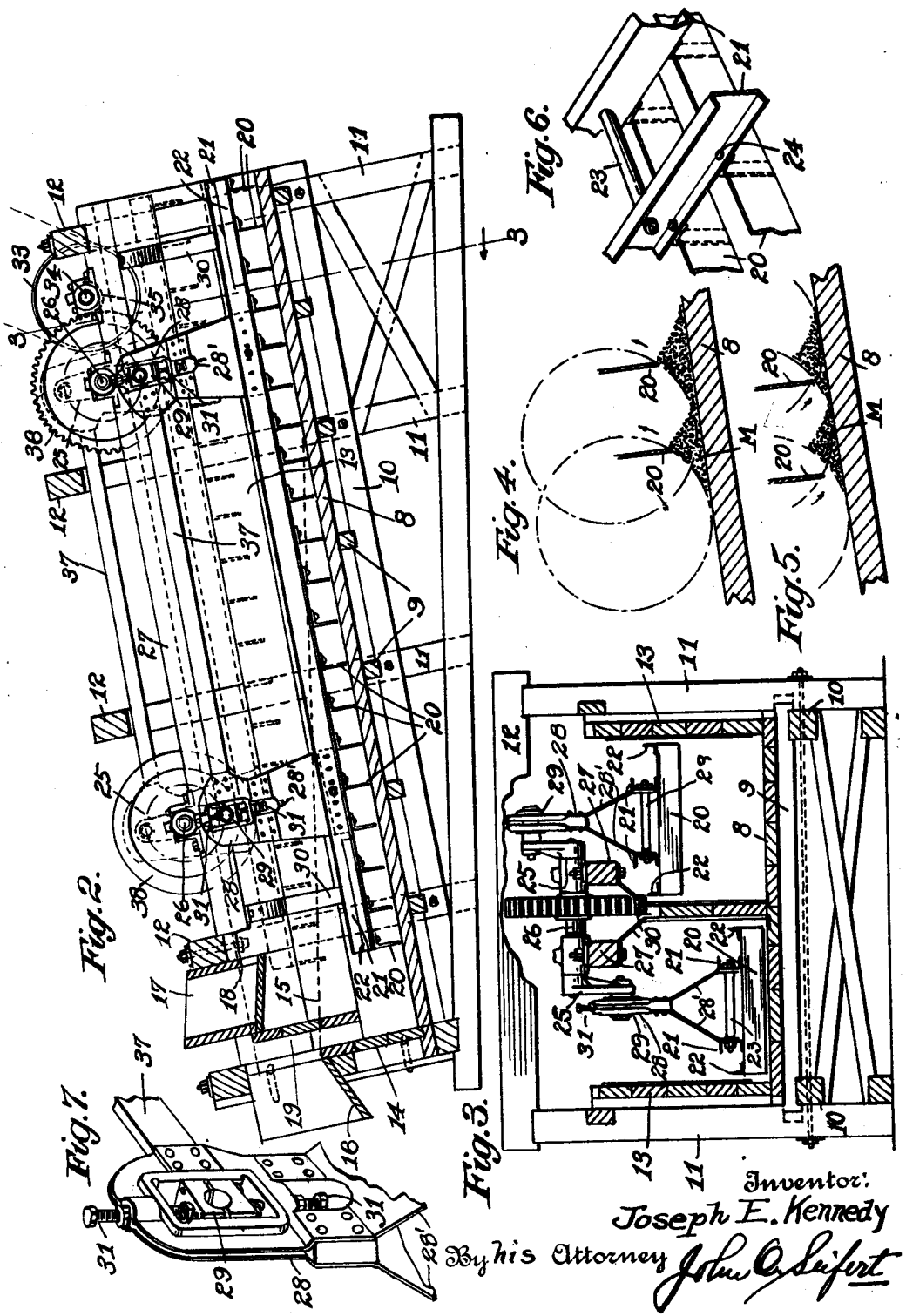

1,719,332

UNITED STATES PATENT OFFICE.

JOSEPH E. KENNEDY, OF NEW YORK, N. Y.

APPARATUS FOR WASHING SAND AND OTHER MATERIAL.

Application filed October 27, 1922. Serial No. 597,410.

This invention relates to apparatus for washing sand to separate colloidal matter and other impurities therefrom, and which is also adapted to wash ores to separate the light from heavier particles of the ore, and it is the object of the invention to provide an improved apparatus for this purpose which is simple and novel in construction and highly efficient in use.

In apparatus of this character as heretofore constructed the material is intermittently moved from one end to the opposite end of a trough by a reciprocable rake or rakes, which rakes at the termination of one movement are moved in a direction transverse to the reciprocable movement into the material and at the termination of the reverse movement are moved in a direction out of the material, with the result that the material is shoved in a bulk along the bottom of the trough and through the water which is contained in and flows or passes through the trough, but the water is not caused to pass through the mass of the material. It is one of the principal objects of the present invention to so move the rake or rakes that as the material is progressively moved in the trough it is also intermixed and thoroughly commingled with the water in the trough thereby thoroughly saturating the material loosening and freeing the light particles from the heavier particles.

A further object of the invention relates to crank mechanism from which the rake or rakes are suspended to actuate the rakes to progressively move and intermix the material.

Another object of the invention relates to improved means to concomitantly rotate the cranks and to equalize the speed of the cranks and counterbalance the movement of the rakes.

In the drawings accompanying and forming a part of this specification, Figure 1 is a plan view of a washing apparatus illustrating an embodiment of my invention.

Figure 2 is a longitudinal sectional view.

Figure 3 is a cross sectional view taken substantially on the line 3—3 of Figure 2.

Figures 4 and 5 are diagrammatic views to illustrate the movement of the rakes and the manner of progressively moving and intermixing the material.

Figure 6 is a fragmentary detail view in perspective to show the construction of a rake; and Figure 7 is a detail view of an adjustable connection of the rakes with the cranks.

Similar characters of reference designate like parts throughout the different views of the drawings.

In carrying out the invention I provide a trough having an inclined bottom 8 supported by transverse members 9 mounted upon longitudinally inclined sills 10 bolted to uprights 11 of the framework connected at their upper ends by transverse members 12 a pair of said members intermediate the end members being arranged in a plane higher than the end members for a purpose to be hereinafter described. The trough is arranged with sides 13 and a transverse dam 14 at the lower end of less height than the sides. A current of water is passed through the trough from the high end a portion of said water being held or retained in the trough to substantially the level indicated by the dotted line 15 by the dam 14, the flow or discharge of the water being over the dam 14 and directed from the dam by a chute 16.

The material to be treated is fed or delivered to the trough at the lower end adjacent the dam 14 from a box or hopper 17 having an outlet 18 toward which the bottom of the hopper inclines to facilitate the delivery of the material through said outlet. To prevent the material as it is fed to the trough from being carried over the dam by the current of water passing through the trough, and to cause the heavier particles to settle in the trough, a baffle 19 is arranged transversely of the trough in the rear of the feed hopper adjacent to but spaced from the dam and to extend below the water level in the trough.

To progressively move the material settled in the trough from the lower to the upper end and deliver the material from said latter end, and simultaneously with the moving of the material agitate or intermix the same to cause the water to thoroughly permeate and assure the loosening and releasing of the light particles from the heavier particles of the material, I provide a rake or rakes in juxtaposed relation in the trough, in the present instance there being two in number, these rakes comprising a series of parallel and horizontally arranged plates 20 attached in predetermined spaced relation to a pair of parallel channel bars 21 at a point intermediate the ends of the plates by angle arms 24, and are also connected to angle irons 22 arranged at the ends of the plates, the channel bars being connected by tie rods 23.

The rakes are operatively connected to and suspended from the pins of cranks 25 fixed to the opposite ends of shafts 26 journaled in bearings mounted adjacent the ends of the trough upon sills 27, the rakes being connected with the cranks 25 by heads 28 having elongated openings therethrough for the engagement of bearing blocks 29 rotatably mounted upon the crank pins, said heads being connected with the rakes by carriers 28' secured at one end to the channel members 21 at opposite sides of the rakes and at the other end to opposite sides of the heads. The cranks of each shaft are arranged diametrically opposite with one rake suspended from the cranks at one end of the shafts and the other rake suspended from the cranks at the opposite ends of the shafts. The sills 27 extend longitudinally of the trough and are supported by the transverse member 12 at the upper end of the trough and such member adjacent the feed hopper 17, and are also supported by brackets 30 from the bottom of the trough. To adjust the rakes relative to the crank pins set screws 31 are arranged in the heads at opposite sides of and to co-operate with the journal boxes 29 to adjust said boxes and retain them in adjusted position by lock nuts on said screws. By the supporting and actuating of the rakes through the cranks 25 the rakes are moved through circular paths whereby as the rake plates are moved into the material M and toward the bottom of the trough they are also moved forward and during such forward movement are moved away from the bottom of the trough and out of the material thereby not only advancing or moving the material forward but also turning over and intermixing the material causing the material to be thoroughly permeated and saturated with the water loosening and freeing the lighter from the heavier particles of material, this movement of the rake plates progressively and successively ridging the material transversely of the trough as shown in Figures 4 and 5. In Figure 5 a pair of the rake plates are shown about to enter the material in the rear of the ridges to turn over and move the material of the ridges forward, and in Figure 4 the plates are shown moving away from the bottom and out of the material. The rake plates move in the direction indicated by the arrows and have an orbit of movement as indicated by the circular dot and dash lines.

The crank shafts and thereby the rakes are actuated from a suitable source of power by a belt passing around a pulley 33 on a shaft 34, a pinion 35 on said shaft meshing with a gear 36 on one of the crank shafts, in the present instance the shaft adjacent the upper end of the trough, the other crank shaft being connected thereto to move concomitantly therewith by rods 37 connected at opposite ends to the heads 28. To equalize the speed of the crank shafts the gear 36 is arranged as a fly wheel and a fly wheel 38 is mounted on the other crank shaft. To permit of the movement of the connecting rods 37 of the heads the intermediate transverse members 12 are arranged in a plane above the end transverse members 12, as clearly shown in Figure 2. By the arrangement of the mounting of the rakes upon the crank pins and the connecting of the rake carrying heads 28 by the rods 37 the entire rake is moved bodily for the engagement of the rake plates 20 into the sand on the bottom of the trough, then forwardly advancing the sand up the inclined bottom of the trough, and then moving the rake plates out of the sand permitting the sand to again settle before the rake plates are again entered therein, and thus assuring that there will not only be a thorough turning or intermixing of the sand but that the water flowing through the trough will thoroughly saturate the sand.

By the arrangement of the cranks on the shafts as described the movement of one rake will counterbalance the movement of the other rake, since as one rake is moving toward the bottom of the trough and into the material the other rake is moving away from the bottom of the trough and out of the material, and as the material advancing movement is being imparted to one rake a receding movement is being imparted to the other rake. If desired the trough may be longitudinally separated by a partition 40 to provide separate compartments for the separate rakes to operate in, which partition extends above the liquid level in the trough to prevent sloshing of the water in the trough, although it has been found in practice that the apparatus operates without practically any sloshing of the water without the apparatus due to the gradual movement of the rake plates into the water and the simultaneous forward movement thereof, and during such latter movement moving out of the water, which is effected through the moving of the rakes in circular paths.

Having thus described my invention I claim:

1. In apparatus of the class described, a trough, rakes, and means to suspend the rakes side by side in the trough and arranged for simultaneously imparting movement in a circular orbit to the rakes, comprising spaced parallel shafts extending transversely above the trough adjacent opposite ends thereof and having a crank arm at each end with the crank arms at one end of the shafts extending diametrically opposite to the crank arms at the opposite ends of the shafts, bearing blocks rotatably mounted on the respective crank arms, heads having elongated openings therethrough for engagement of the bearing blocks for mounting the heads on the crank arms, screws carried by each head for bearing against the upper and lower ends of the bearing blocks to adjust the heads relative to said blocks, carriers fixed to the opposite sides of and extending upwardly from the rakes secured to the heads, and a pair of rods one rod fixed at the ends to the heads at the one end of the shafts and the other rod fixed to the heads at the other ends of the shafts to maintain the crank arms of one shaft in fixed parallel relation to the crank arms of the other shaft and synchronize the movement of the crank arms.

2. In apparatus of the class described, a trough, rakes, and means to support and simultaneously impart movement in a circular orbit to the rakes, comprising a pair of transverse shafts rotatably carried adjacent opposite ends of the trough, each shaft having a crank arm at each end with the crank arms at one end of the shafts extending diametrically opposite to the crank arms at the opposite ends of the shafts, bearing blocks rotatably mounted on pins extending laterally from the arms, carriers for the rakes mounted on said bearing blocks to have adjustment in a direction transversely to the axis of the crank pins, and rods fixed at the ends to the rake carriers at one end of the shafts to maintain the crank arms of one shaft in fixed parallel relation to the arms of the other shaft, and operating one shaft from and in synchronism with the other shaft.

Signed at New York city, in the county of New York and State of New York this 20th day of October, 1922.

JOSEPH E. KENNEDY.